No. 846,726. PATENTED MAR. 12, 1907.
B. W. BURDETT & G. W. GOODWIN, Jr.
PLANTER AND FERTILIZER DISTRIBUTER.
APPLICATION FILED JULY 9, 1906.
2 SHEETS—SHEET 1.
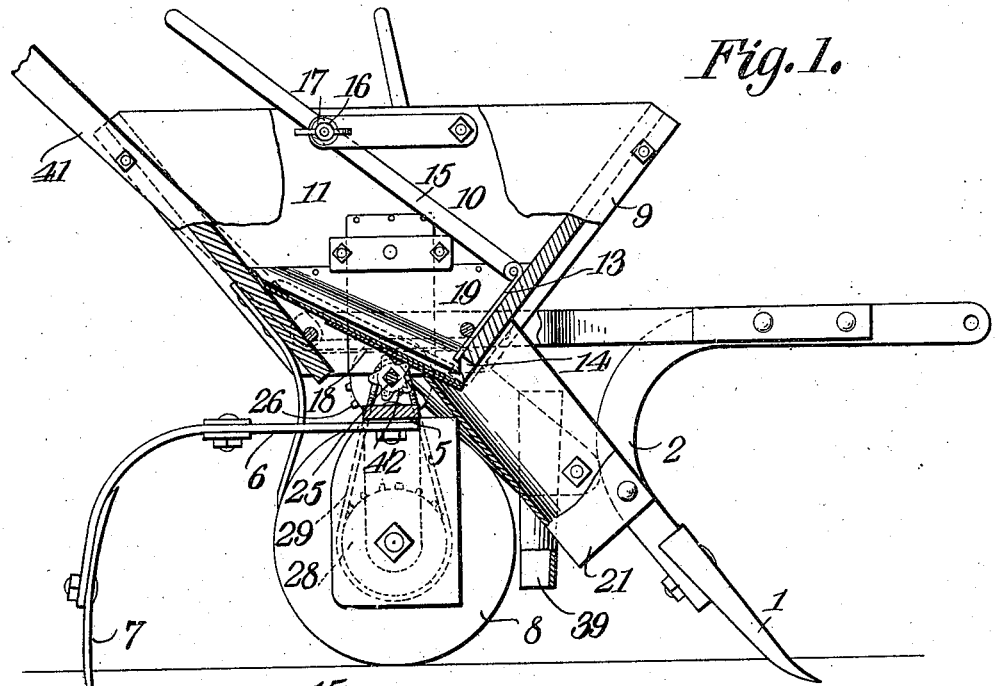
Fig. 1.
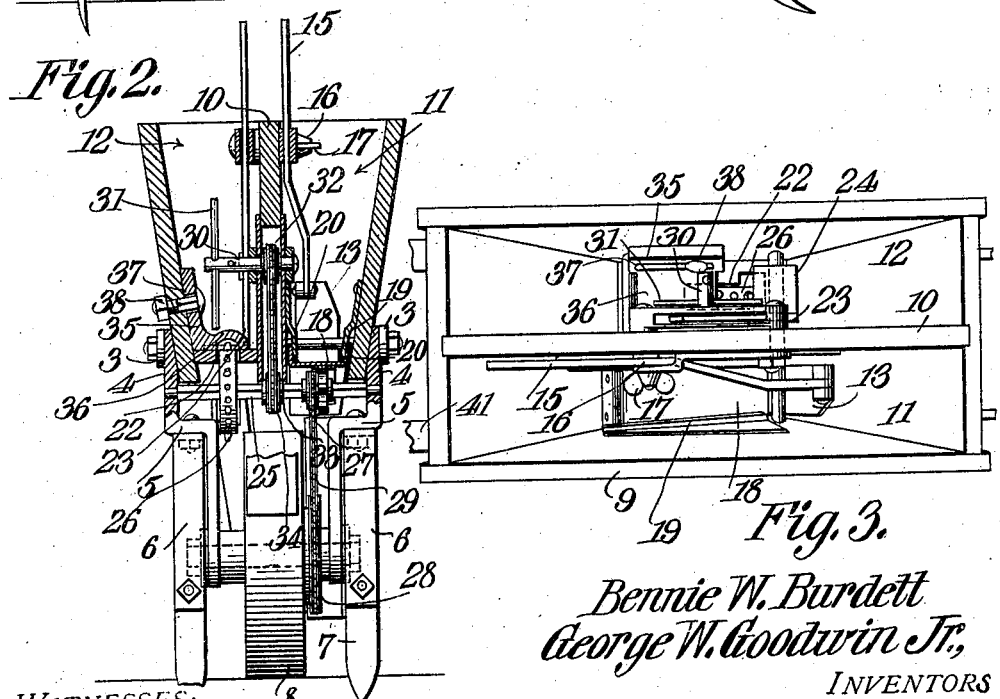
Fig. 2.
Fig. 3.
Bennie W. Burdett
George W. Goodwin Jr.,
INVENTORS
By C. A. Snow & Co.
ATTORNEYS
WITNESSES:

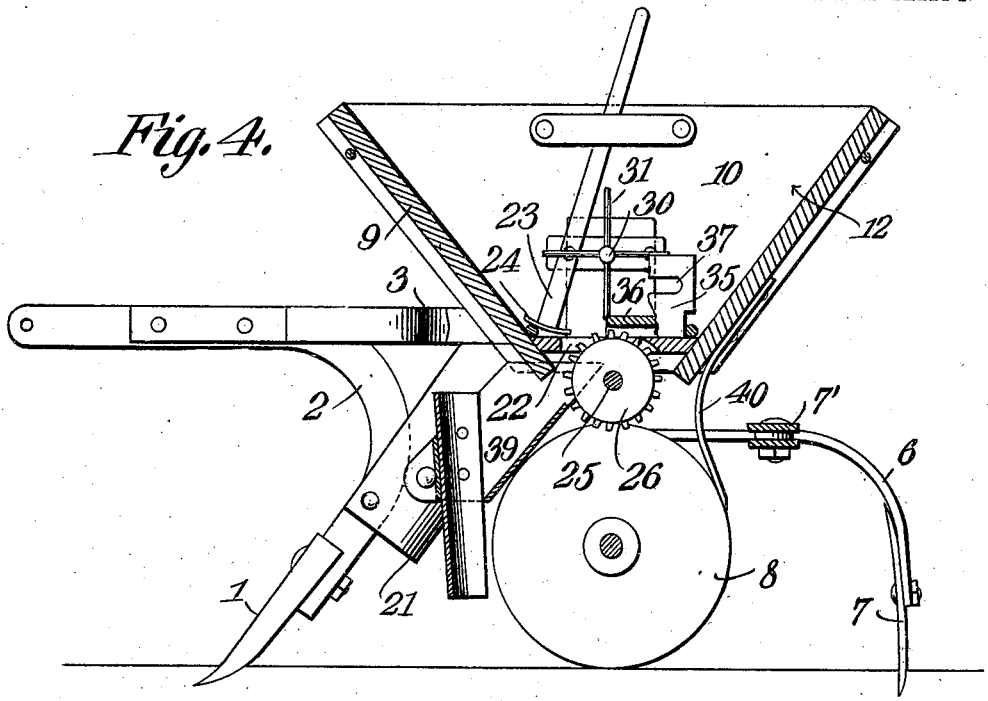
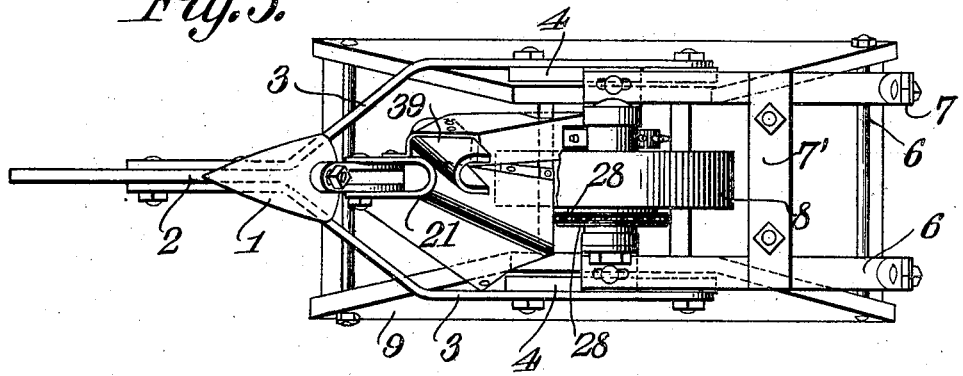

UNITED STATES PATENT OFFICE.

BENNIE WALKER BURDETT AND GEORGE WASHINGTON GOODWIN, JR., OF SIMPSONVILLE, SOUTH CAROLINA.

PLANTER AND FERTILIZER-DISTRIBUTER.

No. 846,726.      Specification of Letters Patent.      Patented March 12, 1907.

Application filed July 9, 1906. Serial No. 325,373.

*To all whom it may concern:*

Be it known that we, BENNIE WALKER BURDETT and GEORGE WASHINGTON GOODWIN, Jr., citizens of the United States, residing at Simpsonville, in the county of Greenville and State of South Carolina, have invented a new and useful Planter and Fertilizer-Distributer, of which the following is a specification.

This invention has relation to a combined planter and fertilizer-distributer; and it consists in the novel construction and arrangements of its parts, as hereinafter shown and described.

The object of the invention is to provide a combined planter and fertilizer-distributer which consists primarily of a superimposed hopper divided by a partition into two compartments, one of which is adapted to hold the seed and the other the fertilizer. A chute is associated with the fertilizer-compartment, and the seed-compartment is also provided with a chute. The chute of the fertilizer-compartment terminates in the advance of the chute of the seed-compartment. The hopper is supported by brackets, which in turn are mounted upon a wheel. The said wheel is provided with a broad tire and is located behind the said chutes. A furrow-opening plow is located at the forward end of the implement, and listing or closing plows are located at the rear end of the implement and are adapted to turn the earth upon the seed and fertilizer after the same has been pressed into the furrow by the said supporting-wheel. The outlets from the hopper for the seed and the fertilizer are provided with suitable valves and regulating mechanism, as will be hereinafter explained. The seed-compartment of the hopper is also provided with a suitable seed-stirrer, which is operated indirectly by the said supporting-wheel.

In the accompanying drawings, Figure 1 is a side elevation of the planter and fertilizer-distributer, showing the fertilizer-compartment of the hopper partly in section. Fig. 2 is a transverse sectional view of the planter and fertilizer-distributer. Fig. 3 is a top plan view of the hopper of the implement. Fig. 4 is a vertical longitudinal sectional view through the seed-compartment of the implement, and Fig. 5 is a bottom plan view of the implement with parts broken away.

The furrow-opener 1 is attached to the lower end of the standard 2. The forward ends of the side beams 3 3 are attached to the said standard 2. The rear ends of said side beams 3 are spaced apart, and the upper ends of the brackets 4 are fixed to said beams 3. At intermediate points the said brackets 4 are provided with the horizontal sections 5, to the under sides of which are pivoted the forward ends of the standards 6. The lister or closing plows 7 are attached to the rear ends of said standards 6. The cross-bars 7' receive the said beams 6 and maintain the same in proper relation to each other. The wheel 8 is journaled between the lower ends of the brackets 4. The said wheel is provided with a broad tire or tread. The hopper 9 is supported by the brackets 4, the upper ends of which are bolted to the said hopper. The partition 10 divides the said hopper into two compartments—11 for the reception of the fertilizer and 12 for the reception of seed. The said partition 10 extends longitudinally of the hopper, and consequently the compartments 11 and 12 are arranged in juxtaposition and are located transversely opposite each other. The valve 13 is located in the compartment 11 and is adapted to move over the outlet 14 thereof. The handle 15 is attached at its lower end to said valve 13 and is fulcrumed at the point 16 to the side of the partition 10. The clamp-nut 17 is provided upon the pivot 16 for impinging the handle 15 when the valve 13 is properly located over the outlet 14.

The chute 18 is located in the bottom of the compartment 11 and is inclined toward the outlet 14 of the said compartment. The plates 19 are attached one to the side of the hopper and the other directly opposite to the said partition 10. The lower edges of said plates pass down over the upper edges of the upturned flanges 20, formed at the edges of the chute 18. The chute 21 is attached at its upper end to the bottom of the hopper just below the outlet 14 and extends at its forward end toward the center of the implement and is secured to the standard 2 in the rear of the furrow-opener 1. The bottom of the compartment 12 is provided with a T-shaped opening 22. The valve 23 is pivoted to the side of the partition 10 and is provided with the horizontal portion 24, which is adapted to move over the head of the T-shaped opening 22.

The shaft 25 is journaled in the upper ends of the brackets 4. The spur-wheel 26 is fixed to the said shaft and enters the opening 22 in the bottom of the hopper-compartment 12. The sprocket-wheel 27 is fixed to said shaft 25, and the sprocket-wheel 28 is fixed to the axle of the wheel 8. The sprocket-chain 29 surrounds the wheels 27 and 28. The stirrer-shaft 30 is journaled in the partition 10. The inner end of said shaft is provided with the radially-extending fingers of arms 31. The sprocket-wheel 32 is fixed to said shaft 30, and the sprocket-wheel 33 is fixed to the shaft 25. The sprocket-chain 34 surrounds the sprocket-wheels 32 and 33.

The slide 35 is located in the bottom of the hopper-compartment 12 and is provided with the ledge 36, which is located over the end of the T-opening 22. The said slide is provided with the elongated slot 37, which receives the bolt 38, which in turn is attached to the side of the hopper-compartment 12. It is obvious that the slide 35 may be moved longitudinally along the bolt 38 and over the opening 22, thus increasing or diminishing the delivery capacity of the same. The chute 39 is attached to the bottom of the hopper 9 and its upper end is located under the T-opening 22 of the hopper-compartment 12. The forward end of said chute is carried toward the center of the implement and is disposed just behind the forward end of chute 21. The forward ends of both chutes, however, are located in advance of the traction-wheel 8. The brush or scraper 40 is attached at its upper end to the hopper 9, and its lower end bears against the periphery of the wheel 8 and is adapted to keep the same free of mud, dirt, &c.

The handles 41 are attached directly to the sides of the hopper 9.

From the foregoing description it is obvious that as the implement is drawn over the ground the plow 1 will open a furrow; that fertilizer will be deposited in said furrow from the chute 21; that the seed will be deposited upon the fertilizer from the chute 39; that the seed and fertilizer will be firmly imbedded in the bottom of the furrow by means of the broad-tired traction-wheel 8, and that the furrow will be closed by the listers 7. The planter, however, is simply a compact and is adapted to be used for putting in such crops as cotton, corn, peas, peanuts, &c. Its various adjustable parts make it possible to be accommodated for planting seed of large or small dimensions.

The star-wheel 42, located upon the shaft 25, engages the under side of the chute 18 and agitates the same, thus facilitating the dropping of the fertilizer.

Having described our invention, what we claim as new, and desire to secure by Letters Patent, is—

1. An implement of the nature described consisting of the hopper, brackets supporting said hopper, a traction-wheel journaled between the lower ends of said brackets, said brackets having at intermediate points horizontal portions, plow-beams pivotally connected at their forward ends to said horizontal portion.

2. An implement of the nature described consisting of a hopper, brackets supporting said hopper, a traction-wheel journaled between the lower ends of said brackets, said brackets having at intermediate points horizontal portions, plow-standards pivoted at their forward ends to the horizontal portions of the brackets, and bars connecting said standards together in proper relation to each other.

3. An implement of the nature described consisting of a hopper, a partition dividing said hopper into compartments, a wheel journaled under the hopper, a stirrer-shaft journaled in the hopper-partition, a sprocket-wheel attached to the stirrer-shaft and being located within the hopper-partition, and means operatively connecting said sprocket-wheel with the traction-wheel.

4. An implement such as described consisting of a hopper, a partition dividing said hopper into compartments, a traction-wheel supporting the hopper, said hopper having an outlet, a chute located in the bottom of the hopper and disposed toward said outlet and having upturned edges, a valve adapted to open and close said outlet, a pivoted handle attached to said valve, a means for securing said handle in a desired position, strips attached to the sides of the hopper and extending down over the edges of said chute.

5. An implement of the nature described consisting of a hopper, a traction-wheel supporting the same, said hopper having an outlet, a spur-wheel rotatively supported and entering said outlet, means operatively connecting said spur-wheel with the traction-wheel, said outlet having an enlarged T end, a pivoted valve adapted to open and close said T end of the outlet, a slide adapted to move longitudinally over the opposite end of the outlet and over the said spur-wheel.

6. An implement such as described consisting of a hopper having an outlet, a wheel supporting said hopper, a spur-wheel suitably journaled and entering the hopper-outlet, means operatively connecting said spur-wheel with the traction-wheel, a longitudinally-movable slide located in the hopper and adapted to move over the hopper-outlet and the spur-wheel, said slide having a ledge which covers and rides over the spurs of the said wheel.

In testimony that we claim the foregoing as our own we have hereto affixed our signatures in the presence of two witnesses.

BENNIE WALKER BURDETT.
GEORGE WASHINGTON GOODWIN, JR.

Witnesses:
C. M. TODD,
R H. ALVERSON.